(12) United States Patent
Sugiyama et al.

(10) Patent No.: US 7,280,811 B2
(45) Date of Patent: Oct. 9, 2007

(54) MULTIMODE WIRELESS TERMINAL AND WIRELESS TRANSMITTER-RECEIVER UNIT

(75) Inventors: Yoshikazu Sugiyama, Kamakura (JP); Masaki Noda, Chigasaki (JP); Makoto Katagishi, Chigasaki (JP); Yutaka Igarashi, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 370 days.

(21) Appl. No.: 10/874,459

(22) Filed: Jun. 22, 2004

(65) Prior Publication Data

US 2005/0032493 A1    Feb. 10, 2005

(30) Foreign Application Priority Data

Jun. 25, 2003  (JP) ............................. 2003-180568
Dec. 25, 2003  (JP) ............................. 2003-429484

(51) Int. Cl.
    *H04B 1/18* (2006.01)
(52) U.S. Cl. ............... 455/168.1; 455/136; 455/553.1; 455/183.2
(58) Field of Classification Search ........ 455/132–136, 455/422, 426, 551, 552.1, 553, 556, 562, 455/118, 119, 127.1–4, 179.1, 183.1, 183.2, 455/161.1, 168.1, 550.1, 553.1, 561, 562.1, 455/196.1, 197.1, 341, 118.19
See application file for complete search history.

(56) References Cited

U.S. PATENT DOCUMENTS

| 6,035,213 | A | 3/2000 | Tokuda et al. |
| 6,195,400 | B1 * | 2/2001 | Maeda ........................ 375/327 |
| 6,373,907 | B1 | 4/2002 | Katsura et al. |
| 6,466,803 | B1 * | 10/2002 | Gardner .................... 455/553.1 |
| 6,487,410 | B1 | 11/2002 | Kontio et al. |
| 6,584,090 | B1 * | 6/2003 | Abdelgany et al. .......... 370/342 |
| 6,597,081 | B2 * | 7/2003 | Dawson et al. ............. 310/258 |
| 7,092,676 | B2 * | 8/2006 | Abdelgany et al. ........... 455/76 |
| 2002/0137488 | A1 * | 9/2002 | Mitama ...................... 455/324 |

FOREIGN PATENT DOCUMENTS

| CN | 1367623 A | 9/2002 |
| JP | 08-186516 | 7/1996 |
| JP | 2002-077965 | 3/2002 |
| JP | 2002-535902 | 10/2002 |
| WO | WO 00/42808 | 7/2000 |

* cited by examiner

*Primary Examiner*—Edward F. Urban
*Assistant Examiner*—Nhan T. Le
(74) *Attorney, Agent, or Firm*—Townsend and Townsend and Crew LLP

(57) ABSTRACT

A multimode wireless terminal suitable for received level monitoring for a base station serving as an intersystem handover destination includes a first wireless transmitter-receiver unit for GSM, a second wireless transmitter-receiver unit for WCDMA, and a communication processor unit and an antenna switch unit connected to these wireless transmitter-receiver units. While conducting communication with a WCDMA network system via the second wireless transmitter-receiver unit, a level of a signal received from a GSM base station is monitored via the first wireless transmitter-receiver unit. A communication processor unit determines whether the level monitoring is interfered with by a WCDMA transmission signal, on the basis of a relation between a WCDMA transmission frequency and a reception frequency supplied from the GSM base station. If interference occurs, then the communication processor unit changes circuit characteristics of the first or second wireless transmitter-receiver unit, and thereby suppresses the interference.

5 Claims, 12 Drawing Sheets

MULTIMODE WIRELESS TERMINAL AND WIRELESS TRANSMITTER-RECEIVER UNIT

BACKGROUND OF THE INVENTION

The present invention relates to a multimode wireless terminal (or a portable telephone) capable of being connected to wireless networks of a plurality of kinds, which are different in wireless communication scheme. In particular, the present invention relates to a multimode wireless terminal and a wireless transmitter-receiver unit suitable for handover conducted between different wireless network systems.

As mobile communication (portable telephone) service networks, various kinds of wireless network systems differing in communication protocol are in operation. For example, wireless networks of the GSM (Global Systems for Mobile communications) are called second generation portable telephone wireless network. Communication service in the GSM wireless networks was started in the 900 MHz band. As the number of subscribers increases thereafter, however, the frequency band is expanded. At the present time, multiband portable telephones that can be used in the 1800 MHz band and the 1900 MHz band as well are spread. As the second generation portable telephone wireless network, PDC, PHS, CDMA of IS-95, cdmaOne (registered trademark) conforming to 3GPP2, and MC-CDMA are known besides the GSM.

On the other hand, as for the WCDMA (Wideband Code Division Multiple Access) scheme proposed as third generation portable telephone wireless networks, communication service in Japanese territory was started in 2002, and overseas communication service in Europe and so on is under contemplation.

In a communication environment in which telephone service networks of a plurality of kinds that are different in wireless communication protocol thus coexist, a wireless terminal (portable telephone) that can be selectively connected to a plurality of telephone service networks with the same terminal becomes convenient. A compound wireless terminal of this kind is typically called multimode type, dual mode type, or multisystem type. By using the multimode wireless terminal, it becomes possible to enjoy telephone service in an optimum communication mode according to the current position of the wireless terminal.

Furthermore, by using a network configuration in which first and second mobile gateway switches that are different in wireless communication protocol are connected to a PSTN (Public Switched Telephone Network) via mobile inter-system gateway switches, it becomes possible to, for example, hand over a multimode wireless terminal that is communicating with another terminal via a wireless base station accommodated in the first mobile gateway switch to a wireless base station using a different protocol accommodated in the second mobile gateway switch without disconnecting a call. Such base station changeover between wireless networks differing in communication protocol is called intersystem handover. By implementing seamless intersystem handover without disconnecting operation of the call connection and communication application while a wireless terminal is conducting communication, communication service using optimum transmission rates and optimum lines according to the application becomes possible.

As a conventional technique concerning the multimode wireless terminal, for example, a portable wireless machine is proposed in JP-A-8-186516. In the portable wireless machine, wireless units of a plurality of kinds respectively associated with wireless network systems and a baseband processor unit shared by the wireless network systems are included, and connection between a wireless unit and the baseband processor unit is changed over according to user's operation.

Furthermore, as a conventional technique concerning the intersystem handover, for example, a communication scheme changeover method is proposed in JP-A-2002-77965. When an intersystem handover request has occurred, the degree of channel margin in a base station of a changeover destination wireless network is calculated and it is determined on the basis of the degree of channel margin whether handover is possible, according to the communication scheme changeover method. At the time of handing over from the third generation wireless network such as the WCDMA to the second generation wireless network such as the GSM, control channel information of the second generation wireless network is provided for the wireless terminal by a down-link control channel of the third generation wireless network. This is proposed in JP-A-2002-535902.

SUMMARY OF THE INVENTION

As for the above-described conventional technique, however, concrete problems occurring at the time of signal level monitoring for the changeover destination base station on which the intersystem handover is based, and a technique for solving the problems are not described.

An object of the present invention is to provide a multimode wireless terminal and a wireless transmitter-receiver unit suitable for received level monitoring for a base station serving as the intersystem handover destination.

Another object of the present invention is to provide a multimode wireless terminal and a wireless transmitter-receiver unit that become useful when handing over a wireless terminal that is communicating with another terminal via one wireless network system to a different wireless network system seamlessly.

Still another object of the present invention is to provide a multimode wireless terminal and a wireless transmitter-receiver unit in which an interference signal component caused during communication in one communication mode and affecting the received level monitoring for another communication mode is suppressed.

In accordance with the present invention, the objects are achieved by a multimode wireless terminal including a first wireless transmitter-receiver unit which conducts communication with a first wireless network system, a second wireless transmitter-receiver unit which conducts communication with a second wireless network system, a communication processor unit connected to the first and second wireless transmitter-receiver units, and an antenna switch unit for separating a received signal supplied from an antenna into components according to frequency bands, distributing the components to the first and second wireless transmitter-receiver units, and outputting transmission signals supplied from the first and second wireless transmitter-receiver units to the antenna. While conducting communication with the second wireless network system via the second wireless transmitter-receiver unit, the communication processor unit monitors a level of a signal received from the first wireless network system via the first wireless transmitter-receiver unit. The communication processor unit determines whether the level monitoring is interfered with by the transmission signal, on the basis of a relation between a transmission frequency supplied to the second wireless network system and a reception frequency supplied from the first wireless network system. If interference occurs, then the communication processor unit changes circuit characteristics of the first or second wireless transmitter-receiver unit, and thereby suppresses the interference.

For example, in the case where the first wireless network system is a WCDMA system and the second wireless network system is a GSM system, it can be determined whether the level monitoring interference has occurred by determining whether a frequency equivalent to twice a center frequency of a signal for GSM level monitoring is present in a range of a frequency spectrum of a WCDMA transmission signal.

In the case of a wireless terminal in which the first wireless transmitter-receiver unit includes a variable gain amplifier for amplifying the received signal supplied from the antenna switch unit, a local oscillator, and a frequency mixer for mixing an output of the variable gain amplifier with a local oscillator signal output from the local oscillator, the communication processor unit controls a gain of the variable gain amplifier and thereby the level monitoring interference can be suppressed.

In the case of a wireless terminal in which a fixed gain amplifier is used instead of the variable gain amplifier and a variable output local oscillator is used instead of the local oscillator, an output level of the variable output local oscillator may be controlled. In the case of a wireless terminal in which the second wireless transmitter-receiver unit includes a variable gain amplifier for amplifying a transmission signal to be output to the antenna switch unit, a gain of the variable gain amplifier may be controlled.

A wireless transmitter-receiver unit according to the present invention is coupled to an antenna switch, a high output amplifier for transmission, and a communication processor unit for wireless terminal, and used. The wireless transmitter-receiver unit includes a first wireless communication unit for conducting communication with a wireless network of a first mode, and a second wireless communication unit for conducting communication with a wireless network of a second mode. The first wireless communication unit includes a mixer circuit for mixing a received signal with a local oscillator frequency and converting a frequency of the received signal, and a signal level changeover circuit for variably controlling an output signal level of the mixer circuit. When monitoring via the first wireless communication unit the received signal supplied from the wireless network of the first mode while conducting communication with the wireless network of the second mode via the second wireless communication unit, the wireless transmitter-receiver unit changes over the output signal level of the mixer circuit by the signal level changeover circuit in response to an order issued by the communication processor unit, so as to make it possible to reduce monitor interference caused by a transmission signal supplied from the second wireless communication unit.

The signal level changeover circuit changes, for example, one of a signal level of the received signal input to the mixer circuit, an operation power supply level of the mixer circuit, and a local oscillator signal level input to the mixer circuit, and thereby changes over the output signal level of the mixer circuit.

The multimode wireless terminal and the wireless transmitter-receiver unit according to the present invention can suppress the influence of interference electric wave during operation in one communication mode and execute base station level monitoring in another communication mode. According to the present invention, therefore, it becomes possible to select a base station having an optimum communication quality in a communication environment in which a plurality of wireless network systems coexist. It becomes effective to implementation of call connection handover between wireless networks having protocols of different kinds.

DESCRIPTION OF THE EMBODIMENTS

Hereafter, embodiments of a multimode portable telephone according to the present invention will be described with reference to the drawings by taking the case where a first wireless network system uses the GSM scheme and a second wireless network system uses the WCDMA scheme as an example.

Figure 1:
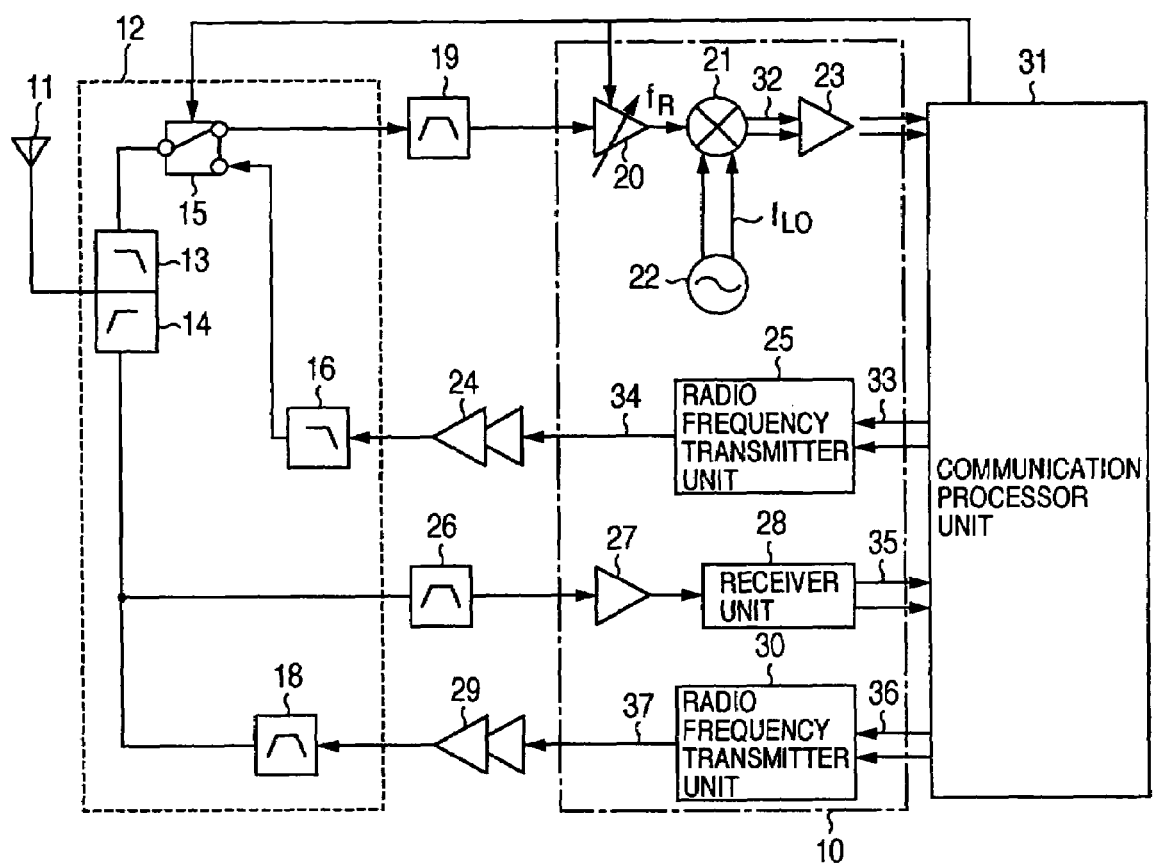
FIG. 1 is a diagram showing a first embodiment of a multimode portable telephone according to the present invention.

FIG. 1 shows a principal part configuration of a first embodiment of a multimode portable telephone and a wireless transmitter-receiver unit according to the present invention.

An antenna 11, an antenna switch unit 12, and a communication processor unit 31 are portions shared by the first and second wireless networks.

A reception band-pass filter 19 for filtering the reception frequency band, a variable gain low noise amplifier 20, a reception orthogonal mixer 21, a reception local oscillator 22, and a low frequency amplifier 23 constitute a wireless receiver circuit for the first wireless network (GSM scheme). A high output amplifier 24 for amplifying a transmission frequency band and a radio frequency transmitter unit 25 constitute a wireless transmitter circuit for the first wireless network.

A reception band-pass filter 26 for filtering the reception frequency band, a low noise amplifier 27, and a receiver unit 28 form a wireless receiver circuit for the second wireless network (WCDMA scheme). A high output amplifier 29 for amplifying a transmission frequency band, and a radio frequency transmitter unit 30 form a wireless transmitter circuit for the second wireless network.

In the present embodiment, the antenna switch unit 12 includes a low-pass filter 13 for passing a signal in a GSM frequency band, a high-pass filter 14 for passing a signal in a WCDMA frequency band, a GSM transmitter-receiver switch 15 for changing over from one of a GSM transmission signal and a GSM received signal to the other, a GSM transmission low-pass filter 16 (which may be a band-pass filter) for passing a signal in a GSM transmission frequency band, and a WCDMA transmission low-pass filter 18 (which may be a band-pass filter) for passing a signal in a WCDMA transmission frequency band. The GSM transmission low-pass filter 16 and the WCDMA transmission low-pass filter 18 may be regarded as components of wireless transmitter circuit for the first and second wireless networks, respectively.

In the GSM, the transmission signal and the received signal are subject to time division multiplexing. Therefore, the communication processor unit 31 controls changeover of the GSM transmitter-receiver switch 15 so as to input a GSM received signal to the reception band-pass filter 19 at the time of reception operation in the GSM and output a GSM transmission signal to the antenna 11 at the time of transmission operation.

In the WCDMA, the transmission signal and the received signal are subject to code division multiplexing. Therefore, it is not necessary to provide a changeover switch such as the GSM transmitter-receiver switch 15 between the wireless transmitter circuit and the wireless receiver circuit. In the case of a scheme other than the CDMA, a changeover switch for selectively connecting the wireless receiver circuit and the wireless transmitter circuit for the second wireless network to the filter 14 may be provided as occasion demands.

The communication processor unit 31 includes, for example, an A/D converter for converting an analog received signal to a digital signal, a D/A converter for converting a digital transmission signal to an analog signal, a code spreader/despreader unit for WCDMA, a baseband processor unit, a RAM for storing data, a ROM for storing a program, and elements such as a control processor, a data interface and an analog interface. The communication processor unit 31 is connected to various user interface devices in the portable telephone, such as a display device, an input key, and a microphone and a speaker for inputting and outputting voice, which are abbreviated in the drawings.

The baseband processor unit includes, for example a modulator-demodulator and a digital signal processing device. Furthermore, according to a control program prepared in the ROM, the control processor executes the communication protocol in the first and second wireless networks, changeover of the antenna switch 12, detection of an interference frequency described later, and gain control of the variable gain low noise amplifier 20.

Principal specifications for the GSM scheme adopted as the first wireless network in the present embodiment and the WCDMA scheme adopted as the second wireless network are as follows.

GSM Scheme:
Uplink frequency: 880 to 915 MHz
Downlink frequency: 925 to 960 MHz
Maximum transmission output: 33.0 dBm
Multiplex scheme: TDMA
Duplex operation scheme: FDD
Modulation scheme: GMSK
Modulation symbol rate: 270.833 ksymbols/sec
Transmission filter: Gaussian filter, BT=0.3

WCDMA Scheme:
Uplink frequency: 1920 to 1980 MHz
Downlink frequency: 2110 to 2170 MHz
Maximum transmission output: 24.0 dBm
Multiplex scheme: CDMA
Duplex operation scheme: FDD
Modulation scheme: QPSK (data modulation), HPSK (spread modulation)
chip rate: 3.84 Mchips/sec
Transmission filter: Root raised cosine filter, roll of factor=0.22

When receiving a signal from the first wireless network, in the portable telephone of the first embodiment, the communication processor unit 31 controls the GSM transmitter-receiver switch 15 so as to input a signal in a GSM reception frequency band (925 to 960 MHz) to the reception band-pass filter 19. The signal filtered by the reception band-pass filter 19 is amplified by the variable gain low noise amplifier 20, and input to an RF input terminal of the reception orthogonal mixer 21. At this time, the gain of the variable gain low noise amplifier 20 is set equal to an initial value that satisfies a minimum reception sensitivity standard value.

Orthogonal signals, which are mutually in phase difference relation of 90 degrees, generated by the reception local oscillator 22 are input to a local oscillator input terminal of the reception orthogonal mixer 21. The reception orthogonal mixer 21 mixes an RF input signal with a local oscillator input signal, and generates an I signal and a Q signal (hereafter these two signals are collectively referred to as IQ signal) 32 of a baseband band. Here, the direct conversion reception scheme is adopted. In the direct conversion reception scheme, the baseband band signals are obtained from the received signal by conducting mix once. The IQ signal output from the reception orthogonal mixer 21 is input to the communication processor unit 31 via the low frequency amplifier 23, subjected to digital conversion and GMSK demodulation, and then processed as received data.

When transmitting a signal to the first wireless network, the communication processor unit 31 changes over the GSM transmitter-receiver switch 15 so as to output the GSM transmission signal to the antenna 11. The transmission data is subjected to GMSK modulation in the communication processor unit 31, and supplied to the radio frequency transmitter unit 25 as an IQ signal 33. The radio frequency transmitter unit 25 conducts orthogonal modulation on the IQ signal 33 and converts it to a modulated signal 34 in the transmission frequency band. The modulated signal 34 is amplified by the high output amplifier 24, subjected to harmonic suppression in the GSM transmission low-pass filter 16, and output from the antenna 11.

A signal received from the second wireless network is input to the low noise amplifier 27 via the band-pass filter 26. The radio frequency signal amplified by the low noise amplifier 27 is subjected to orthogonal mixing in the receiver unit 28, converted to an IQ signal 35 in the baseband band, and input to the communication processor unit 31. The IQ signal 35 is despread, subjected to QPSK demodulation, and then processed as received data in the communication processor unit 31.

Transmission data to be transmitted to the second wireless network is converted to IQ signals 36 code-multiplexed by QPSK modulation (data modulation) and band-spread by HPSK modulation (spread modulation) in the communication processor unit 31. The IQ signals 36 are subjected to orthogonal modulation in the radio frequency transmitter unit 30, and input to the high output amplifier 29 as a modulated signal 37 in the transmission frequency band. The modulated signal 37 is amplified by the high output amplifier 29, subjected to harmonic suppression in the low pass filter 18, and sent out from the antenna 11.

GSM received level monitoring required when shifting the portable telephone in the present embodiment from a WCDMA mode talking state to a GSM mode talking state will now be described with reference to FIG. 2.

Figure 2:
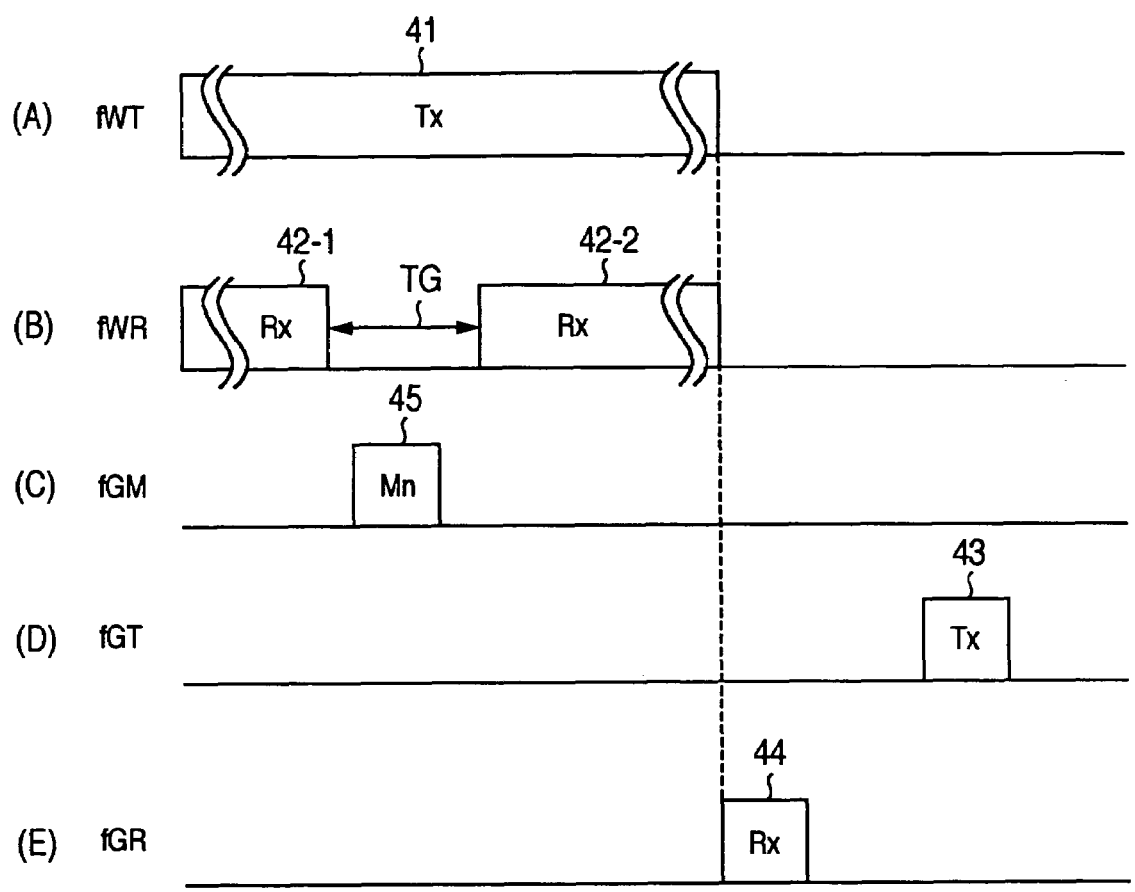
FIG. 2 is a diagram showing an example of received level monitoring according to the present invention.

In FIG. 2, (A) indicates a WCDMA transmission signal 41 having a frequency fWT, (B) a WCDMA received signal 42 (42-1 and 42-2) having a frequency fWR, (D) a GSM transmission signal 43 having a frequency fGT, (E) a GSM received signal 44 having a frequency fGR, and (C) a GSM monitor signal 45 having a frequency fGM received for intersystem handover.

The portable telephone in the talking state in the WCDMA mode is executing operation of transmitting an uplink signal (transmission signal 41) to a WCDMA wireless base station in parallel with operation of receiving a downlink signal (received signal 42) from the WCDMA wireless base station. For handing over a WCDMA call now under connection to the GSM wireless network seamlessly, it is necessary to detect a GSM base station that is located around the portable telephone and that can conduct communication. Operation of detecting a received level of a signal from a peripheral base station for the sake of handover is typically called base station level monitoring. In the present embodiment, the portable telephone in operation in the WCDMA mode executes GSM base station level monitoring for the intersystem handover's sake, in addition to WCDMA base station level monitoring for the handover's sake in the WCDMA wireless network system.

In the communication protocol of the WCDMA, a transmission blank interval TG (Transmission Gap), which makes the signal reception processing on the portable telephone side unnecessary, is provided in a downlink signal (received signals 42-1, 42-2, . . . ) as shown in (B) in FIG. 2 in order to make possible the base station level monitoring for the intersystem handover's sake. In the transmission blank interval TG previously notified of by the WCDMA base station, the portable telephone in the present embodiment suspends the reception operation in the WCDMA mode, sets the reception frequency to a monitor frequency fGM of the GSM, and conducts received level detection of the monitor signal 45 or decoding of control data. The GSM base station level monitoring is finished within the transmission blank interval TG. By setting the reception frequency to the reception frequency fWR in the WCDMA mode again, reception processing of the subsequent WCDMA received signal 42-2 is resumed.

In this way, information required for the intersystem handover is collected in operation in the WCDMA mode. When a GSM base station to which handover can be conducted has been found, the WCDMA base station that is now conducting communication is requested to conduct handover to the GSM base station. By thereafter changing the reception frequency to the reception frequency fGR in the GSM mode, the GSM received signal 44 can be received.

By the intersystem handover, the portable telephone can shift the call from the WCDMA wireless network to the GSM wireless network seamlessly without disconnecting the call under communication. In other words, the portable telephone can receive application data following the WCDMA received signal 42-2 as the GSM received signal 44, and transmit application data subsequent to the WCDMA transmission signal 41 as the GSM transmission signal 43.

Figure 3:
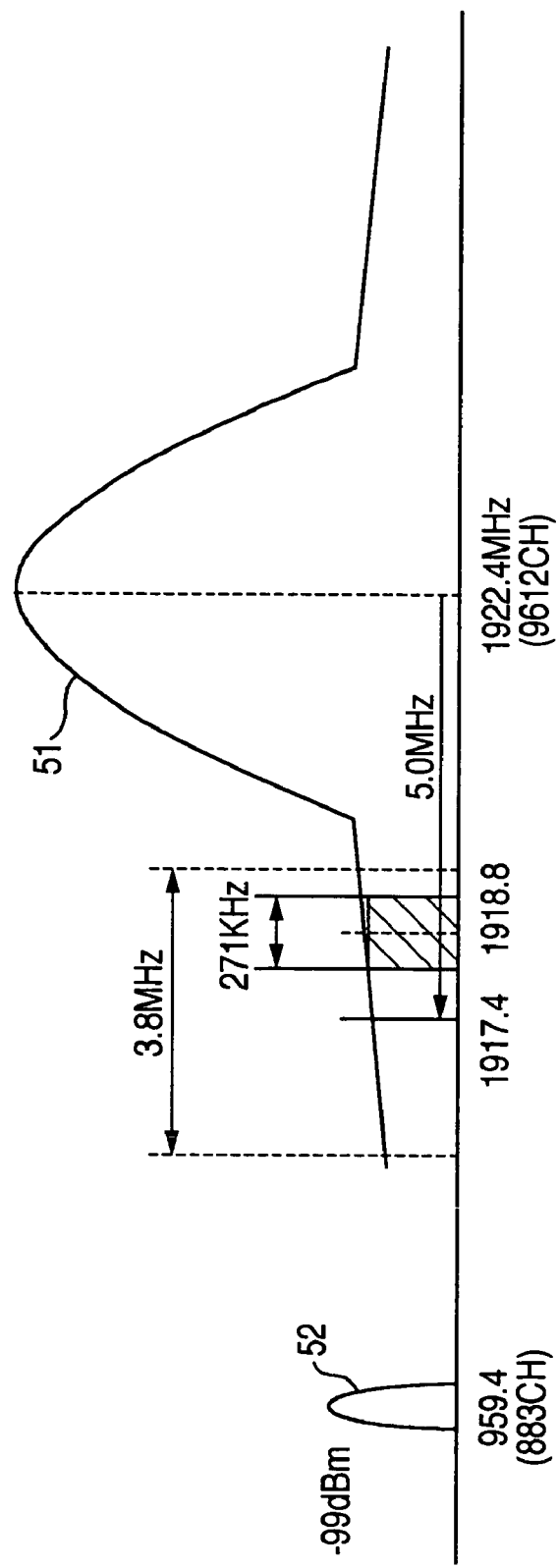
FIG. 3 is a diagram showing an example of a frequency spectrum of a received signal at the time of received level monitoring.

FIG. 3 shows a frequency spectrum of the antenna input signal in the transmission blank interval TG. Reference numeral 51 denotes a frequency spectrum of the WCDMA transmission signal 41 shown in FIG. 2, and 52 denotes a frequency spectrum of the GSM received signal 45.

In the example shown in FIG. 3, the WCDMA frequency spectrum 51 has a center frequency of 1922.4 MHz, and ARFCN (Absolute Radio Frequency Channel Number) ="9612". The GSM frequency spectrum 52 has a center frequency of 959.4 MHz (ARFCN="883"). At the time of reception operation of the GSM received signal 45, a frequency that is equal to an integer times the center frequency fGM (or a frequency that is equal to the center frequency fGM divided by an integer) becomes an interference frequency called spurious response.

In the example shown in FIG. 3, 1918.8 MHz equivalent to twice the GSM center frequency 959.4 MHz becomes the interference frequency according to an interference generation mechanism described later with reference to FIGS. 4A, 4B, 5A and 5B. If an electric wave having this interference frequency is mixed during the reception of the GSM received signal 45, then the reception signal-to-noise ratio falls and there is a fear of sound quality degradation or communication disconnection caused by degradation of the BER (bit error rate).

Figure 4A:
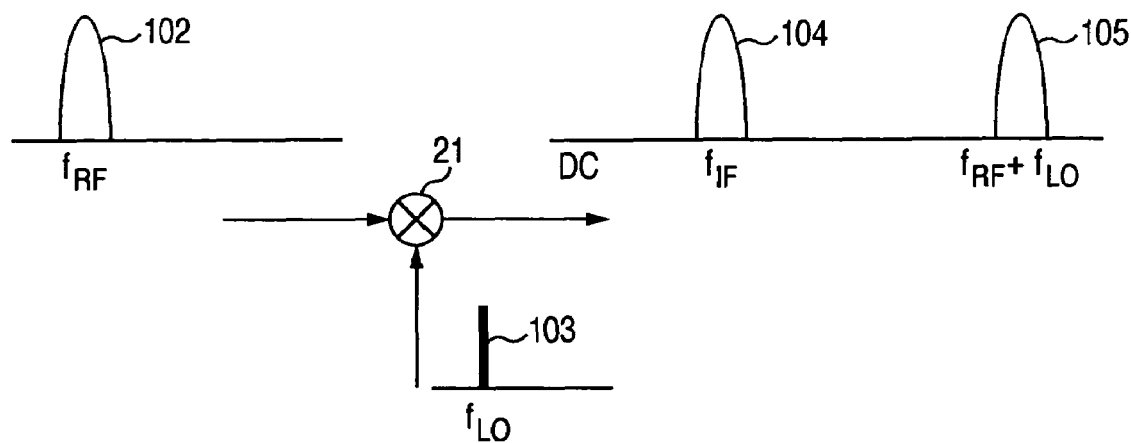
FIGS. 4A and 4B are diagrams showing frequency relations between an input signal and an output signal of a frequency mixer 21.
Figure 4B:
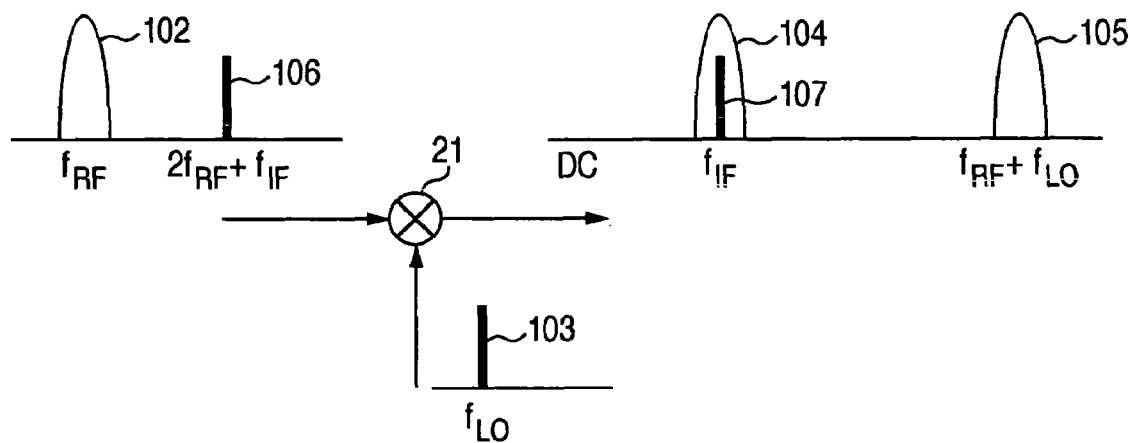

FIGS. 4A and 4B show relations among center frequencies fRF, fLO and fIF respectively of an input signal 102 to be modulated by the frequency mixer 21, a local oscillator signal 103, and an output signal 104 of the frequency mixer 21. If the input signal of the frequency mixer 21 has only the signal component of the reception frequency fRF, the output signal becomes a signal component 104 having a frequency fIF=fRF−fLO and a signal component 105 having a frequency fRf+fLO as shown in FIG. 4A. If the input signal includes an interference signal 106 having a frequency of 2fRF+fIF, however, an interference component 107, which coincides in frequency with fIF, is generated as shown in FIG. 4B. This is because a signal component satisfying the relation 2fRF+fIF−(2fLO)=fIF is generated by distortion caused in the frequency mixer 21.

Figure 5A:
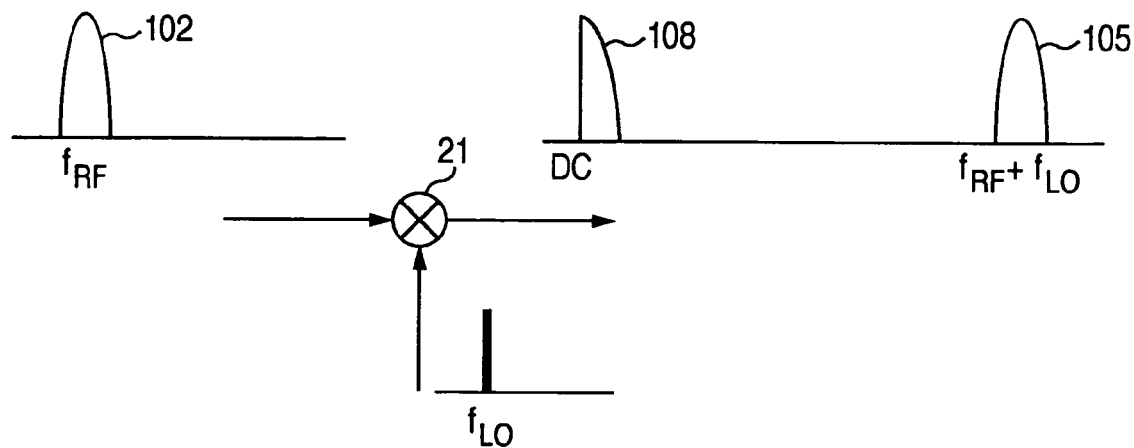
FIGS. 5A and 5B are diagrams showing frequency relations between an input signal and an output signal of a frequency mixer 21 obtained when a direct conversion scheme is applied thereto.
Figure 5B:
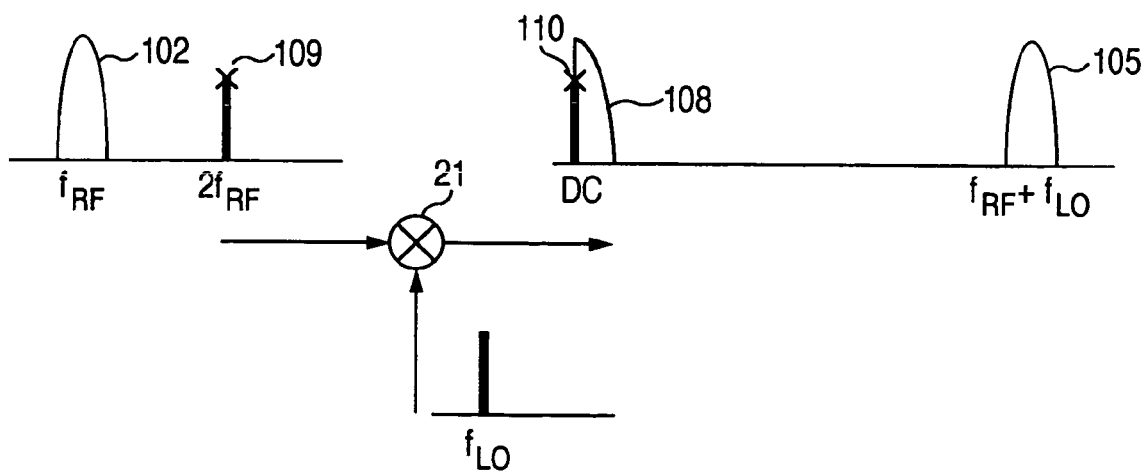

FIGS. 5A and 5B show relations between frequencies of the input and output signals in the case where the frequency mixer 21 is a mixer of the direct conversion scheme. The direct conversion scheme is a scheme in which a desired modulated wave signal (baseband signal) is obtained by conducting frequency conversion once without generating a signal at the intermediate frequency fIF and the local oscillator frequency fLO is set equal to the center frequency fRF of the received signal.

If the input signal has only the signal component 102 of the reception frequency fRF, the output signal becomes a signal component 108 having a band ranging from DC to a modulated frequency and a signal component 105 of a frequency fRF+fLO as shown in FIG. 5A. If the input signal includes an interference signal 109 having a frequency of 2fRF, however, a DC interference component 110 is generated as shown in FIG. 5B. This is because a signal component having a frequency that satisfies the relation 2fRF−2fLO=0 is generated by distortion caused in the frequency mixer 21.

The signal level near the interference frequency 1918.8 MHz in the WCDMA frequency spectrum 51 shown in FIG. 3 will now be obtained. In the WCDMA, the transmission output level is defined as 24.0 dBm and the adjacent channel leak power ratio is defined as 33 dBc or less. As shown in FIG. 3, leak power defined in standards becomes power in a 3.8 MHz band centering around a frequency of 1917.4 MHz (and 1927.4 MHz) separated from the carrier frequency 1922.4 MHz by 5.0 MHz. Adjacent channel leak power Padj becomes $$Padj=24-33=-9.0 \text{ dBm} \tag{1}$$

In the WCDMA transmission signal, the band having the 3.8 MHz width is suppressed by the transmission filter 18 and it becomes nearly flat. Therefore, leak power Pud in the reception bandwidth (271 kHz) of the GSM centering around the spurious response interference frequency (1918.8 MHz) is obtained by the following expression.

$$Pud=-9.0-10 \log(271/3800)=-20.5 \text{ dBm} \tag{2}$$

On the other hand, in the GSM scheme, an interference level that provides BER=2.0% when a signal having a desired signal level (=−99 dBm) is stipulated as interference exclusion capability. As for the spurious response interference signal, $$\text{interference signal level} \geq -43 \text{ dBm} \tag{3}$$

is stipulated. In the GSM portable telephone, therefore, it is necessary to make the spurious response interference signal level equal to −43 dBm or less. As represented by the expression (2), however, the signal level Pud near the interference frequency 1918.8 MHz caused by the WCDMA transmission signal is greater than −43 dBm represented by the expression (3). If a spurious response interference frequency exists, therefore, then it becomes impossible to receive the GSM signal normally.

In the wireless terminal (portable telephone) of the present embodiment, the following measures are taken in order to avoid the influence of the spurious response interference frequency contained in the above-described WCDMA transmission frequency spectrum. When conducting GSM base station level monitoring during the communication in the WCDMA mode, the communication processor unit 31 checks the relation between the center frequency of the WCDMA transmission signal and the frequency of the GSM received signal. If the spurious response interference frequency of the GSM received signal exists in the leak power frequency band formed by the WCDMA transmission signal, the signal-to-noise ratio of the GSM received signal is improved by controlling the gain of the variable gain low noise amplifier 20.

In the example shown in FIG. 3, the WCDMA transmission frequency becomes 1922.4 MHz. Therefore, the existence range (fleak1 to fleak2) of the leak power becomes $$fleak1=1922.4-(5.0+1.9)=1915.5 \text{ MHz} \tag{4}$$

$$fleak2=1922.4+(5.0+1.9)=1929.3 \text{ MHz} \tag{5}$$

It can be determined whether the spurious response interference frequency exists by determining whether a frequency which is equal to N times or one-Nth (where N is an integer) as high as the GSM monitor frequency 959.4 MHz is present in the range of fleak1 to fleak2. In the illustrated example, $$1915.5<959.4\times2<1929.3 \tag{6}$$

Therefore, it will be appreciated that reception of the GSM monitor signal is interfered with by the WCDMA transmission signal.

The signal-to-noise ratio of the GSM received signal 45 to be subjected to the level monitoring becomes great as the signal input level of the variable gain low noise amplifier 20 becomes high. If the signal input level exceeds a certain value, however, then the signal-to-noise ratio saturates, and the signal-to-noise ratio remains at a nearly constant value even if the signal input level is raised. On the other hand, the interference signal component increases in proportion to the gain of the variable gain low noise amplifier 20. If the spurious response interference frequency is present in the portable telephone shown in FIG. 1, therefore, the communication processor unit 31 reduces the gain of the variable gain low noise amplifier 20 than its initial value, and reduces the RF input signal level of the orthogonal mixer 21, and consequently it becomes possible to enhance the interference exclusion capability.

Figure 12:
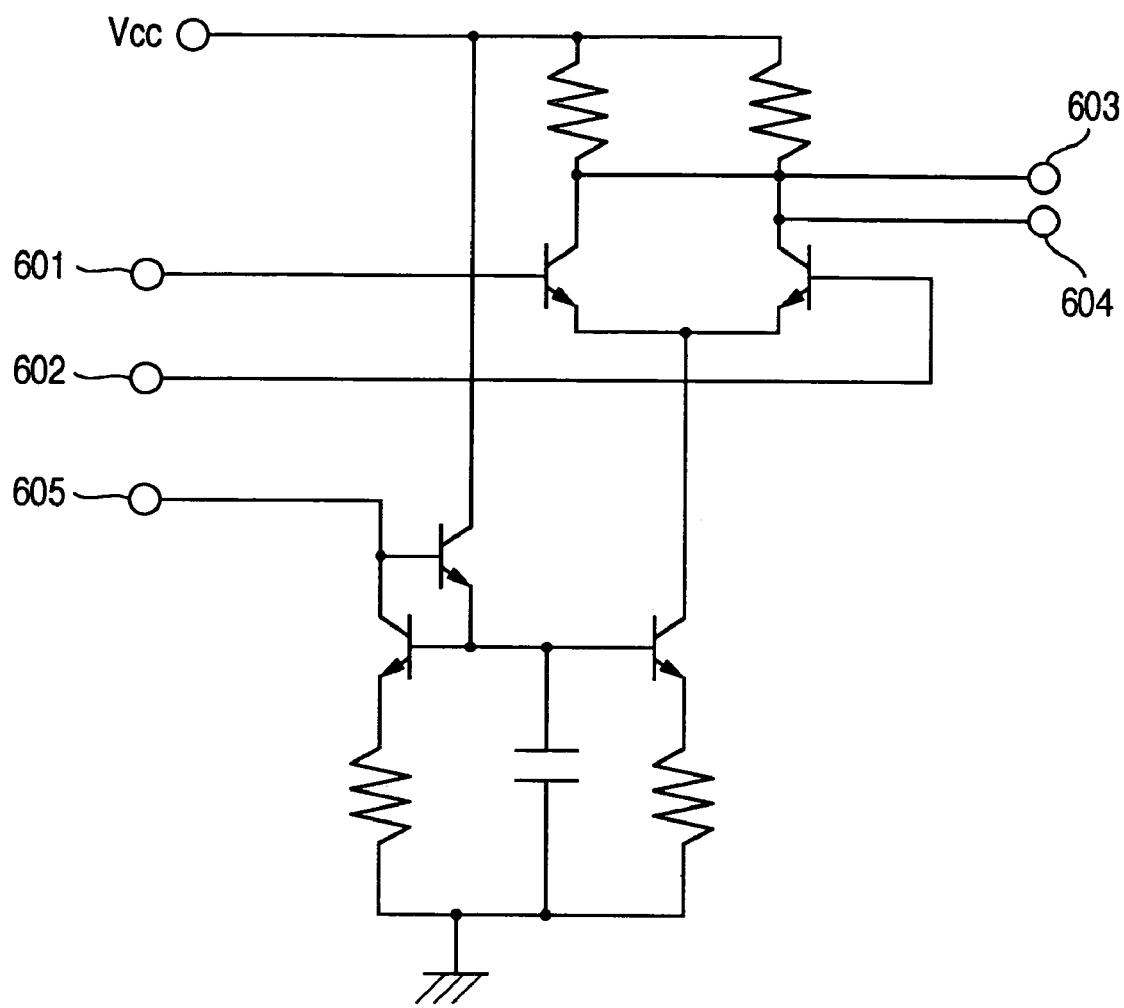
FIG. 12 is a diagram showing an embodiment of a variable gain low noise amplifier 20.

An embodiment of the variable gain low noise amplifier 20 is shown in FIG. 12.

In FIG. 12, reference numerals 601 and 602 denote input terminals and 603 and 604 denote output terminals. Reference numeral 605 denotes an input terminal (control terminal) of a gain control signal output from the communication processor unit 31. As described above, when the spurious response interference frequency is judged to be present, the communication processor unit 31 decreases a control current supplied to the control terminal 605 as the gain control signal as compared with the initial state. As a result, the gain of the variable gain low noise amplifier 20 falls, and the output signal level at the output terminals 603 and 604 falls. When the spurious response interference state is judged to have been dissolved, the communication processor unit 31 increases the gain of the variable gain low noise amplifier 20 by restoring the control current supplied to the control terminal 605 to its initial state. In this way, the gain of the variable gain low noise amplifier 20 is changed and the RF input level of the orthogonal mixer 21 is controlled according to whether the spurious response interference is present. As a result, it becomes possible to enhance the interference exclusion capability.

While the portable telephone is operating in the GSM mode, the transmission operation and the reception operation are executed in a time division manner. Therefore, the WCDMA base station level monitoring required for the intersystem handover from the GSM wireless network to the WCDMA wireless network is conducted by utilizing an interval between transmission and reception intervals of the application data. In this case, signal transmission from the portable telephone is not conducted. Therefore, it is not necessary to conduct gain control for the variable gain low noise amplifier 20 for the interference exclusion's sake.

The above-described base station level monitoring is executed selectively according to whether the wireless network that is currently conducting communication is a system of priority mode specified previously by the user. For example, if talking is started in the WCDMA mode by using a portable telephone with WCDMA specified as the priority mode and GSM specified as the unpriority mode, then it is not necessary to conduct the GSM base station level monitoring so long as the communication quality in the WCDMA mode is fine. In this case, the communication processor unit 31 starts GSM base station level monitoring for the intersystem handover's sake when the communication quality in the WCDMA network has degraded than the reference value and the continuation of the communication in the WCDMA mode has become difficult.

On the contrary, if talking is started in the GSM mode, which is the unpriority mode, due to a constraint in communication environment, or a shift to the GSM mode is conducted during talking, then the communication processor unit 31 periodically repeats the WCDMA base station level monitoring in order to implement the intersystem handover to the WCDMA wireless network, which is assigned the priority mode.

In the circuit configuration shown in FIG. 1, circuit elements in the portion 10 surrounded by a dotted line are integrated on one semiconductor substrate, and provided as a wireless transmitter-receiver unit IC. This wireless transmitter-receiver unit includes a first wireless communication unit (the variable gain low noise amplifier 20, the reception orthogonal mixer 21, the reception local oscillator 22, the low frequency amplifier 23 and the radio frequency transmitter unit 25) for conducting communication in the GSM mode, and a second wireless communication unit (the low noise amplifier 27, the receiver unit 28 and the radio frequency transmitter unit 30) for conducting communication in the WCDMA mode. The receiver circuit in the first wireless communication unit includes the variable gain low noise amplifier 20 in a stage preceding the orthogonal mixer 21.

The wireless transmitter-receiver unit in the present embodiment has the following feature. If the transmission signal component of the WCDMA exerts influence when monitoring a signal received from the GSM network via the first wireless communication unit while the wireless transmitter-receiver unit is conducting communication via the second wireless communication unit, then the wireless transmitter-receiver unit can reduce the signal level of the interference signal component input to the reception orthogonal mixer 21 by controlling the gain of the variable gain low noise amplifier 20 in the first wireless communication unit.

As described with reference to FIG. 3, the monitor interference occurs when the transmission frequency spectrum of the WCDMA contains a signal component that becomes the spurious response interference frequency with respect to the center frequency of the GSM received signal 52. If the spurious response interference frequency is not present, it is not necessary to reduce the input signal level of the reception orthogonal mixer 21.

Figure 6:
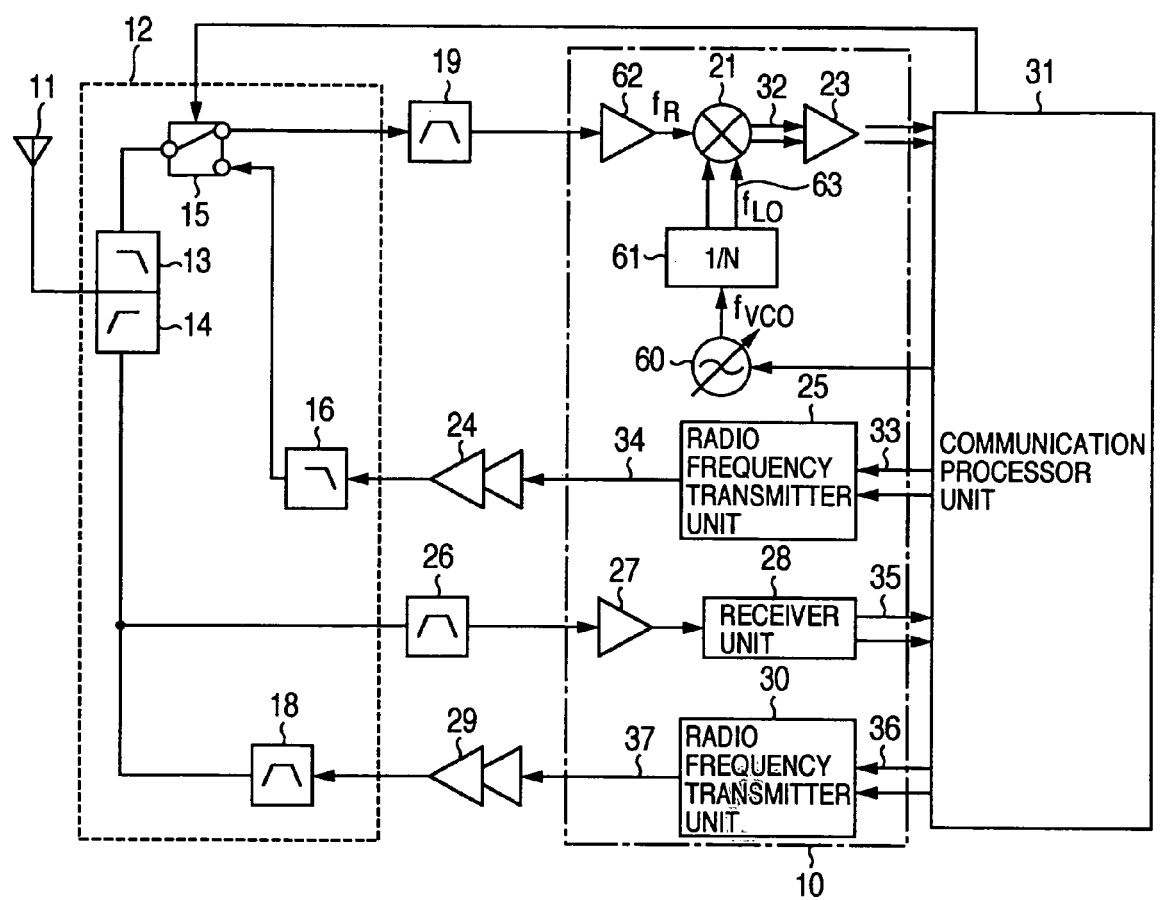
FIG. 6 is a diagram showing a second embodiment of a multimode portable telephone according to the present invention.

FIG. 6 shows a second embodiment of a portable telephone according to the present invention.

The portable telephone of the second embodiment has a configuration in which a low noise amplifier 62 having a fixed gain is used instead of the variable gain low noise amplifier 20 shown in the first embodiment and an output of a variable output local oscillator 60 is supplied to the reception orthogonal mixer 21 via an N frequency divider (where N is a positive integer) 61. The second embodiment is the same as the first embodiment in configuration of other portions. In the present embodiment, an adjacent channel leak signal in the WCDMA transmission signal leaks into, for example, an input terminal of the N frequency divider 61 via a printed-circuit board, and it is input to the orthogonal mixer 21 together with a local oscillator signal 63 having a frequency fLO as an interference signal that is 1/N times in frequency.

In the same way as the first embodiment, the communication processor 31 calculates values of the expressions (4) and (5) in the transmission blank interval TG of the WCDMA received signal, and determines whether the spurious response interference frequency is present by judging the relation between the GSM monitor frequency and the leak electric wave represented by the expression (6). If the spurious response interference frequency is present, the communication processor unit 31 in the present embodiment enhances the interference exclusion capability by reducing the output level of the variable output local oscillator 60 from its initial value and reducing the level of the interference signal input to the orthogonal mixer 21.

In the present embodiment as well, circuit elements in a portion 10 surrounded by a dotted line are integrated on one semiconductor substrate, and it can be provided as a wireless transmitter-receiver unit IC, in the same way as the first embodiment.

Figure 7:
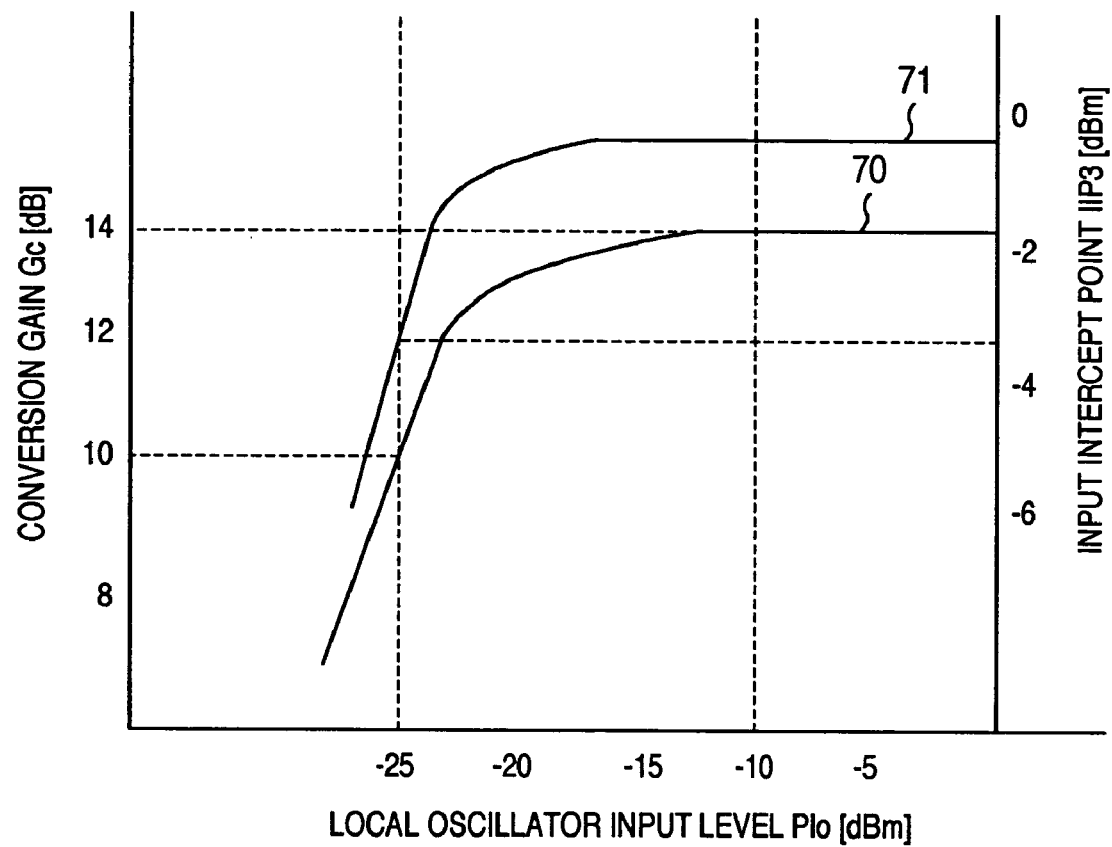
FIG. 7 is a diagram showing characteristic examples of a conversion gain of a mixer and an RF input third-order intercept point applied to a second embodiment.

FIG. 7 shows an example of characteristics of the orthogonal mixer 21 obtained when a GaAs·FET mixer operating in the received signal frequency band 925 to 960 MHz of the GSM is used.

A value of a conversion gain 70 and a value of a third-order intercept point 71 of the RF input, each of which changes according to the input level (abscissa) of the local oscillator signal 63, are shown. In general, the local oscillator input level is determined by trade-off between the conversion gain 70 required to obtain the minimum reception sensitivity and the input third-order intercept point 71 determined from exclusion capability required for the mutual modulation interference.

It is supposed in the second embodiment that, for example, the output initial value of the variable output local oscillator 60 has become −10 dBm. If the communication processor unit 31 reduces the output level of the variable output local oscillator 60 to −25 dBm when a spurious response interference frequency is present, then the conversion gain 70 falls from 14 dB to 10 dB. Therefore, the level at which the interference component contained in the local oscillator signal fLO appears in the output of the orthogonal mixer 21 falls, and the exclusion capability against the interference caused by the WCDMA leak signal increases. On the other hand, the input third-order intercept point 71 falls from 0 dBm to −4 dBm. However, the third-order intercept point is needed to exclude the mutual modulation interference. With respect to harmonics of the local oscillator signal handled as the interference signal in the present invention, there is no problem even if the third-order intercept point becomes lower as compared the initial state.

By the way, if the orthogonal mixer 21 has a configuration capable of reducing the mixer output level of the interference component contained in the local oscillator signal fLO by raising the local oscillator input level, then control may be exercised so as to raise the output of the variable output local oscillator 60 when an interference frequency is present. Furthermore, it is possible to make the output level of the N frequency divider 61 instead of making the output of the local oscillator 60 variable, and reduce the output level of the N frequency divider 61.

Figure 8:
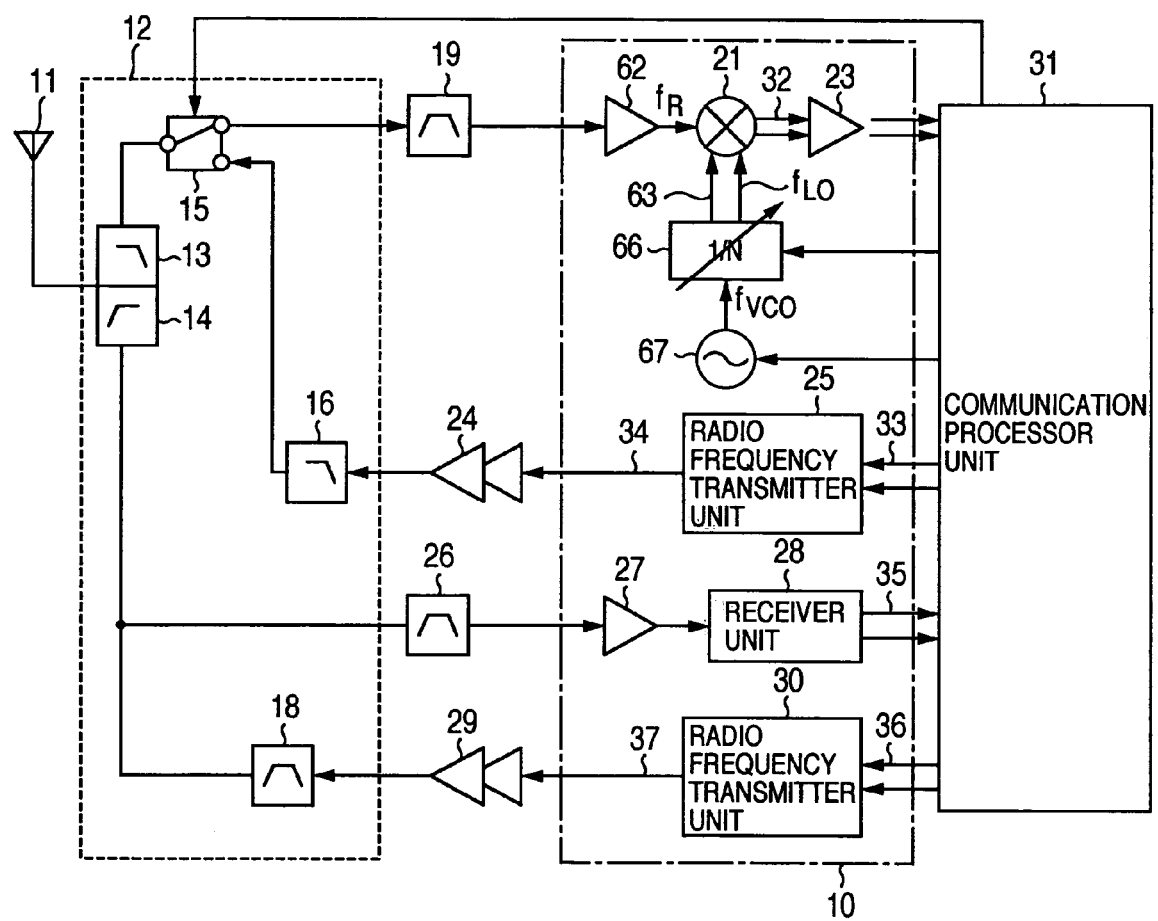
FIG. 8 is a diagram showing a variation of a second embodiment.

FIG. 8 shows an embodiment in which a fixed output local oscillator 67 is connected to the orthogonal mixer 21 via a variable output N frequency divider 66. In the present embodiment, the interference component appearing in the mixer output 32 is decreased when an interference frequency is present, by reducing the variable output N frequency divider 66 and reducing both the original signal component fLO contained in a local oscillator signal 63 and an interference signal component subjected to N frequency division.

Figure 9:
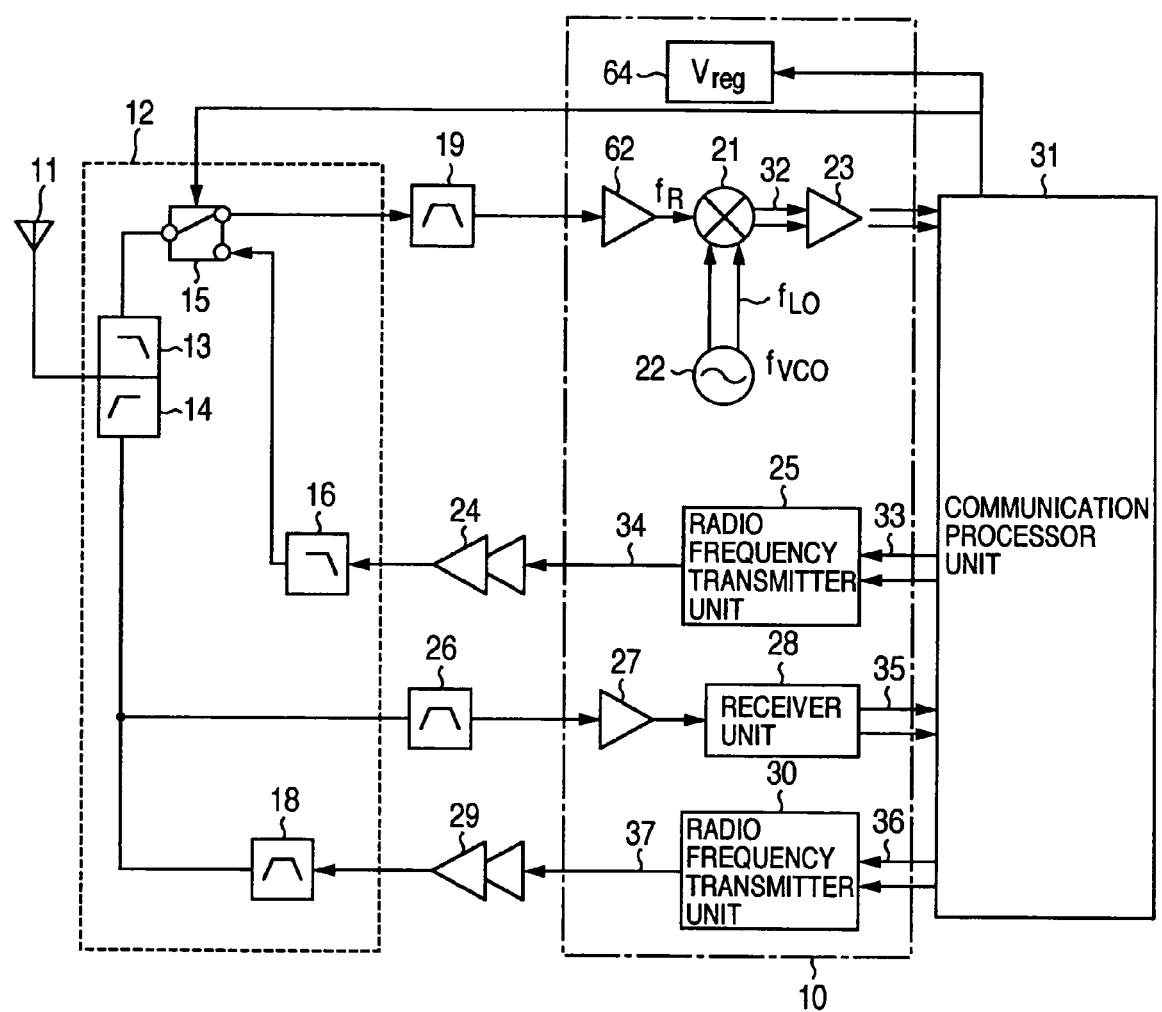
FIG. 9 is a diagram showing a third embodiment of a multimode portable telephone according to the present invention.

FIG. 9 shows a third embodiment of a portable telephone according to the present invention.

The portable telephone in the third embodiment has a configuration in which a fixed gain low noise amplifier 62 is used instead of the variable gain low noise amplifier 20 shown in the first embodiment and the conversion gain of the reception orthogonal mixer 21 is controlled by a variable voltage regulator 64. The third embodiment is the same as the first embodiment in configuration of other portions.

In the same way as the first embodiment, the communication processor 31 calculates values of the expressions (4) and (5) in the transmission blank interval TG of the WCDMA received signal, and determines whether the spurious response interference frequency is present by judging the relation between the GSM monitor frequency and the leak electric wave represented by the expression (6). If the spurious response interference frequency is present, the communication processor unit 31 enhances the interference exclusion capability by reducing output voltage of the variable voltage regulator 64 from its initial value and reducing the conversion gain of the reception orthogonal mixer 21.

Figure 10:
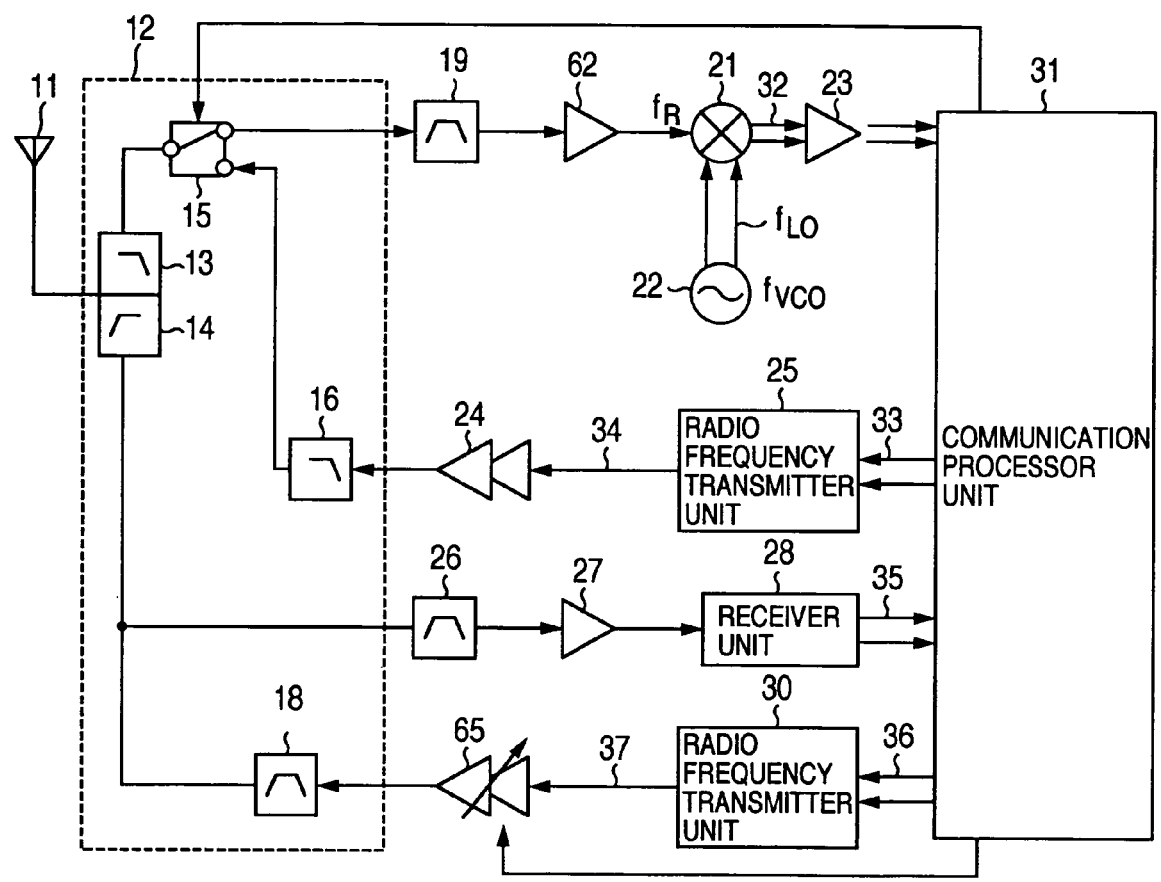
FIG. 10 is a diagram showing a fourth embodiment of a multimode portable telephone according to the present invention.

FIG. 10 shows a fourth embodiment of a portable telephone according to the present invention.

The portable telephone in the fourth embodiment has a configuration in which a variable gain output amplifier 65 capable of being controlled in amplification gain in the transmission frequency band is used instead of the high output amplifier 29 in the wireless transmitter circuit for the second wireless network system (WCDMA) shown in the first embodiment. The fourth embodiment is the same as the first embodiment in configuration of other portions.

In the same way as the first embodiment, the communication processor 31 calculates values of the expressions (4) and (5) in the transmission blank interval TG of the WCDMA received signal, and determines whether the spurious response interference frequency is present by judging the relation between the GSM monitor frequency and the leak electric wave represented by the expression (6). If the spurious response interference frequency is present, the communication processor unit 31 reduces the gain of the variable gain output amplifier 65 and reduces the transmission output of the WCDMA. As a result, the leak power in the 271 kHz width centering around 1918.8 MHz shown in FIG. 3 falls. Therefore, the interference signal level input to the reception orthogonal mixer 21 for the GSM falls, and it becomes possible to enhance the interference exclusion capability.

Figure 11:
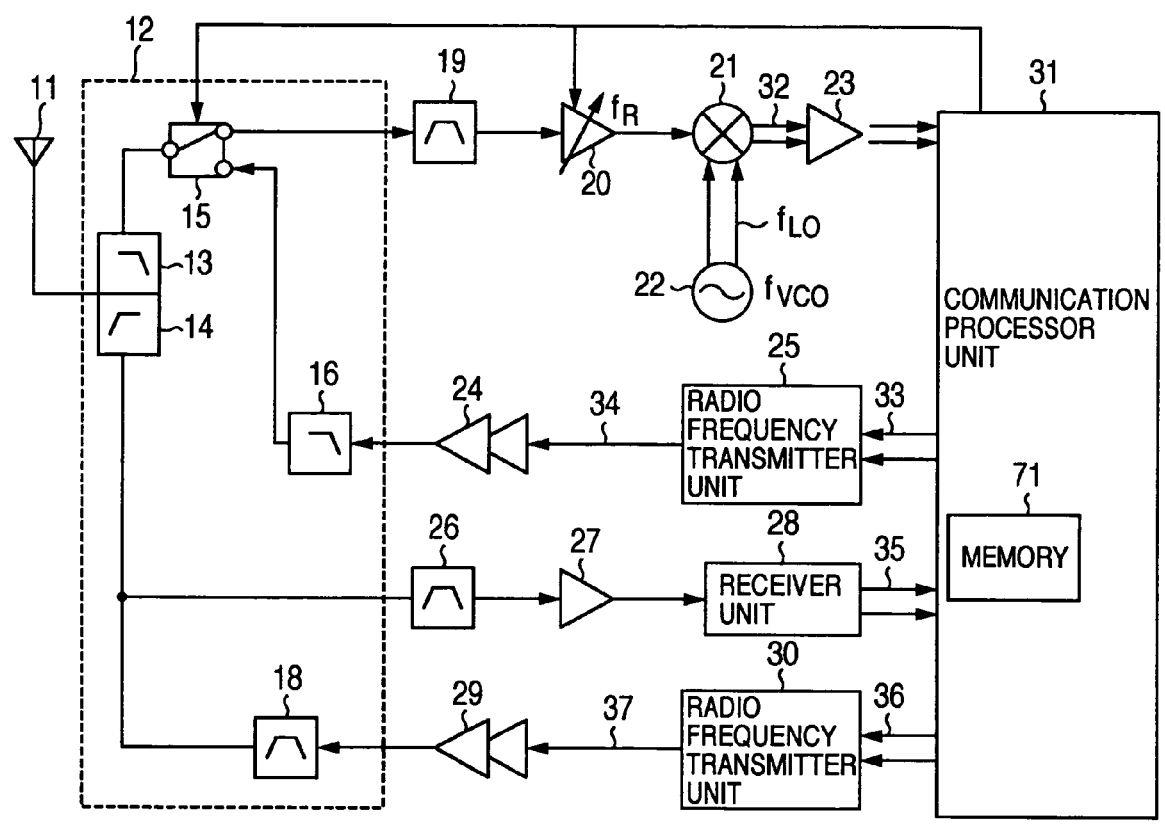
FIG. 11 is a diagram showing a fifth embodiment of a multimode portable telephone according to the present invention.

FIG. 11 shows a fifth embodiment of a portable telephone according to the present invention.

The portable telephone in the fifth embodiment has a feature that possible combinations of the GSM reception frequency generated by the spurious response interference frequency and the WCDMA transmission frequency (possible combinations of the frequency channel number ARFCN) are previously stored in the memory 71 included in the signal processor unit 31 in a table form. When executing the GSM base station level monitoring in the WCDMA mode in the present embodiment, the communication processor unit 31 determines whether the currently applied combination of the WCDMA transmission frequency and the GSM reception frequency (which is, in the example shown in FIG. 3, a combination of channel number "883" and channel number "9612") has already been registered in the memory 71. If the combination has already been registered in the memory, then communication processor 31 judges the spurious response interference frequency to be present, and executes control in order to exclude the reception interference.

According to the present embodiment, it can be quickly determined whether the spurious response interference frequency is present, without successively executing the calculations of the expressions (4) and (5) and the decision using the expression (6). Therefore, it becomes possible to efficiently conduct the gain control and level monitoring in order to exclude the reception interference within the transmission blank interval TG. By the way, FIG. 11 shows an example in which the memory 71 is used in the portable telephone of the first embodiment. However, it is evident that the fifth embodiment can be applied to the portable telephones of the second to fourth embodiments as well.

In the above-described embodiments, it is determined whether the spurious response interference frequency is present, supposing the relation that the interference signal level $\geq -43$ dBm represented by the expression (3) as the interference exclusion capability of the GSM portable telephone. A sixth embodiment according to the present invention has the following feature. A threshold Pthrs represented by the following expression (7) is set for the transmission output level of the WCDMA on the basis of a relation between the adjacent channel leak power ratio 33 dBc stipulated for the WCDMA and the expression (2). And it is determined whether the spurious response interference is present, by utilizing the threshold Pthrs.

$$P\text{thrs} = -43 + 33 = -10 \text{ dBm} \quad (7)$$

The portable telephone has a transmission power control function based on the distance from the base station or the communication environment. If the transmission output level of the WCDMA has become lower than $-10$ dBm as a result of the transmission power control, then it is meant that the spurious response interference does not occur and the GSM base station level monitoring signal can be received stably. Therefore, the communication processor unit 31 compares the current transmission output level of the WCDMA with the threshold Pthrs ($=-10$ dBm). If the transmission output level is higher than the threshold Pthrs, then the communication processor unit 31 executes the control operation for excluding the reception interference described with reference to the first to fifth embodiments. If the transmission output level is lower than or equal to the threshold Pthrs, then the communication processor unit 31 omits the reception interference exclusion control and executes the GSM base station level monitoring.

The embodiments have been described supposing that the WCDMA scheme has a band of 1920 to 1980 MHz for the uplink frequency and a band of 2110 to 2170 MHz for the downlink frequency. It is evident that the present invention can be applied to an uplink frequency in the range of 1850 to 1910 MHz and a downlink frequency in the range of 1930 to 1990 MHz in the band 2 assigned to the third generation portable telephone, and an uplink frequency in the range of 1710 to 1785 MHz and a downlink frequency in the range of 1805 to 1880 MHz in the band 3 as well.

In the embodiments, the second generation GSM is used as the first wireless network system, and the third generation WCDMA is used as the second wireless network system. However, for example, a system other than the GSM, such as the PDC, PHS, or IS-95 CDMA, may also be used as the first wireless network system, and a system other than the WCDMA, such as CDMA-1X or MC-CDMA based on 3GP2 may also be used as the second wireless network system. In the embodiments, the portable telephone in which the mode is changed over between the second generation portable telephone system and the third generation portable telephone system has been described. However, application of the present invention to the mode changeover between the second generation portable telephone systems or the mode changeover between the third generation portable telephone systems is not excluded.

In the embodiments, the multimode portable telephone has been described. However, the features of the present invention can also be applied to, for example, terminals for wireless LAN utilizing a wireless access network using the 2.4 GHz band stipulated in IEEE802.11b and IEEE802.11g, a wireless access network using the 5.2 GHz band stipulated in ARIB STD-T70, ARIB STD-T71 (=IEEE802.11a) and ARIB STD-T72, or a wireless access network using the 4.9 GHz band.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multimode wireless terminal comprising:
a first wireless transmitter-receiver unit which conducts communication with a first wireless network system;
a second wireless transmitter-receiver unit which conducts communication with a second wireless network system;
a communication processor unit connected to said first and second wireless transmitter-receiver units; and
an antenna switch unit which separates a received signal supplied from an antenna into components according to frequency bands, distributing the components to said first and second wireless transmitter-receiver units, and outputting transmission signals supplied from said first and second wireless transmitter-receiver units to the antenna,
wherein, while conducting communication with the second wireless network system via said second wireless transmitter-receiver unit, said communication processor unit monitors a level of a signal received from the first wireless network system via said first wireless transmitter-receiver unit, and
wherein said communication processor unit determines whether the level monitoring is interfered with by the transmission signal, on the basis of a relation between a transmission frequency supplied to the second wireless network system and a reception frequency supplied from the first wireless network system, and if interference occurs, said communication processor unit changes circuit characteristics of said first or second wireless transmitter-receiver unit and thereby suppresses the interference,
said first wireless transmitter-receiver unit comprises an amplifier which amplifies the received signal supplied from said antenna switch unit, a variable output local oscillator, and a frequency mixer which mixes an output of said amplifier with a local oscillator signal output from said variable output local oscillator, and
said communication processor unit controls an output level of said variable output local oscillator, and thereby suppresses the interference.

2. A multimode wireless terminal comprising:
a first wireless transmitter-receiver unit which conducts communication with a first wireless network system;
a second wireless transmitter-receiver unit which conducts communication with a second wireless network system;
a communication processor unit connected to said first and second wireless transmitter-receiver units; and
an antenna switch unit which separates a received signal supplied from an antenna into components according to frequency bands, distributing the components to said first and second wireless transmitter-receiver units, and outputting transmission signals supplied from said first and second wireless transmitter-receiver units to the antenna,
wherein, while conducting communication with the second wireless network system via said second wireless transmitter-receiver unit, said communication processor unit monitors a level of a signal received from the first wireless network system via said first wireless transmitter-receiver unit, and
wherein said communication processor unit determines whether the level monitoring is interfered with by the transmission signal, on the basis of a relation between a transmission frequency supplied to the second wireless network system and a reception frequency supplied from the first wireless network system, and if interference occurs, said communication processor unit changes circuit characteristics of said first or second wireless transmitter-receiver unit and thereby suppresses the interference,
said first wireless transmitter-receiver unit comprises an amplifier which amplifies the received signal supplied from said antenna switch unit, a local oscillator, a variable output frequency divider which conducts frequency division with a factor of N on a local oscillator signal output from said local oscillator, and a frequency mixer which mixes an output of said amplifier with an output of said variable output frequency divider, and
said communication processor unit controls an output level of said variable output frequency divider and thereby suppresses the interference.

3. A multimode wireless terminal comprising:
a first wireless transmitter-receiver unit which conducts communication with a first wireless network system;
a second wireless transmitter-receiver unit which conducts communication with a second wireless network system;
a communication processor unit connected to said first and second wireless transmitter-receiver units; and
an antenna switch unit which separates a received signal supplied from an antenna into components according to frequency bands, distributing the components to said first and second wireless transmitter-receiver units, and outputting transmission signals supplied from said first and second wireless transmitter-receiver units to the antenna,
wherein, while conducting communication with the second wireless network system via said second wireless transmitter-receiver unit, said communication processor unit monitors a level of a signal received from the first wireless network system via said first wireless transmitter-receiver unit, and
wherein said communication processor unit determines whether the level monitoring is interfered with by the transmission signal, on the basis of a relation between a transmission frequency supplied to the second wireless network system and a reception frequency supplied from the first wireless network system, and if interference occurs, said communication processor unit changes circuit characteristics of said first or second wireless transmitter-receiver unit and thereby suppresses the interference, said first wireless transmitter-receiver unit comprises an amplifier which amplifies the received signal supplied from said antenna switch unit, a local oscillator, a frequency mixer which mixes an output of said amplifier with a local oscillator signal output from said local oscillator, and a variable output voltage supply unit which supplies a variable power supply voltage to said frequency mixer, and said communication processor unit controls the output voltage of said variable output voltage supply unit and thereby suppresses the interference.

4. A multimode wireless terminal comprising:

a first wireless transmitter-receiver unit which conducts communication with a first wireless network system;

a second wireless transmitter-receiver unit which conducts communication with a second wireless network system;

a communication processor unit connected to said first and second wireless transmitter-receiver units; and an antenna switch unit which separates a received signal supplied from an antenna into components according to frequency bands, distributing the components to said first and second wireless transmitter-receiver units, and outputting transmission signals supplied from said first and second wireless transmitter-receiver units to the antenna, wherein, while conducting communication with the second wireless network system via said second wireless transmitter-receiver unit, said communication processor unit monitors a level of a signal received from the first wireless network system via said first wireless transmitter-receiver unit, and wherein said communication processor unit determines whether the level monitoring is interfered with by the transmission signal, on the basis of a relation between a transmission frequency supplied to the second wireless network system and a reception frequency supplied from the first wireless network system, and if interference occurs, said communication processor unit changes circuit characteristics of said first or second wireless transmitter-receiver unit and thereby suppresses the interference, said communication processor unit comprises a memory which stores specific combinations of the transmission frequency and the reception frequency that cause the interference, in ranges of a transmission frequency band applicable to the first wireless network and a reception frequency band used for the monitoring, and said communication processor unit determines whether the level monitoring is interfered with by referring to said memory.

5. A multimode wireless terminal comprising:

a first wireless transmitter-receiver unit which conducts communication with a first wireless network system;

a second wireless transmitter-receiver unit which conducts communication with a second wireless network system;

a communication processor unit connected to said first and second wireless transmitter-receiver units; and an antenna switch unit which separates a received signal supplied from an antenna into components according to frequency bands, distributing the components to said first and second wireless transmitter-receiver units, and outputting transmission signals supplied from said first and second wireless transmitter-receiver units to the antenna, wherein, while conducting communication with the second wireless network system via said second wireless transmitter-receiver unit, said communication processor unit monitors a level of a signal received from the first wireless network system via said first wireless transmitter-receiver unit, and wherein said communication processor unit determines whether the level monitoring is interfered with by the transmission signal, on the basis of a relation between a transmission freciuency supplied to the second wireless network system and a reception frequency supplied from the first wireless network system, and if interference occurs, said communication processor unit changes circuit characteristics of said first or second wireless transmitter-receiver unit and thereby suppresses the interference, said communication processor unit discriminates a frequency band in which leak power becomes at least a predetermined value, from the transmission frequency supplied to the second wireless network system, and said communication processor unit determines whether interference with the level monitoring is present by determining whether a frequency which is equivalent to an integer times or a reciprocal of an integer times as great as the reception frequency in the first wireless network system is contained in said frequency band.

* * * * *